US007870389B1

(12) United States Patent
Leung et al.

(10) Patent No.: US 7,870,389 B1
(45) Date of Patent: *Jan. 11, 2011

(54) METHODS AND APPARATUS FOR AUTHENTICATING MOBILITY ENTITIES USING KERBEROS

(75) Inventors: Kent K. Leung, Mountain View, CA (US); Srinath Gundavelli, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 946 days.

This patent is subject to a terminal disclaimer.

(21) Appl. No.: 10/328,522

(22) Filed: Dec. 24, 2002

(51) Int. Cl.
*H04L 9/00* (2006.01)

(52) U.S. Cl. .................. 713/168; 713/153; 713/171; 713/182; 726/1; 726/2; 380/255; 380/258; 709/225; 709/227; 709/229; 455/411; 455/432.1; 455/433; 455/435.1; 455/436

(58) Field of Classification Search .................. 709/229, 709/225; 713/150, 168, 171, 151, 153, 175, 713/182; 380/247, 255, 258; 370/254, 351; 455/436, 433, 411, 432.1, 435.1
See application file for complete search history.

(56) References Cited

U.S. PATENT DOCUMENTS 4,692,918 A    9/1987   Elliott et al.

(Continued)

FOREIGN PATENT DOCUMENTS

CH          694678          5/2005

(Continued)

OTHER PUBLICATIONS

Sufatrio, Kwok Yan Lam, Mobile IP Registration Protocol: A security Attack and New Secure Minimal Public-Key Based Authentication, Centre for Systems Security Research, BNSDOCID: XP_10341845A_.*

(Continued)

*Primary Examiner*—Nasser Moazzami
*Assistant Examiner*—Shanto M Abedin
(74) *Attorney, Agent, or Firm*—Weaver Austin Villeneuve & Sampson LLP

(57) ABSTRACT

Methods and apparatus for generating and transmitting dynamically generated session keys are disclosed. A key distribution center generates a session key between the key distribution center and a first mobility entity (e.g., an access point). Once the session key between the key distribution center and the access point is transmitted to the access point, the access point retrieves a shared session key between the access point and a Mobile Node from the key distribution center, which is then transmitted to the Mobile Node, enabling the Mobile Node to connect to the network. Similarly, either the Mobile Node or its Home Agent retrieves a session key between the key distribution center and the access point from the key distribution center, enabling a shared session key between the Home Agent and the Mobile Node to be obtained from the key distribution center. The Mobile Node (or Home Agent) then transmits the shared session key to the Home Agent (or Mobile Node). Once the shared session key is obtained by both the Home Agent and the Mobile Node, the shared session key is used to authenticate registration messages (e.g., including registration request and reply packets). In this manner, dynamically generated session keys may be used to securely transmit registration messages in a Mobile IP environment.

40 Claims, 10 Drawing Sheets

U.S. PATENT DOCUMENTS

| | | | |
|---|---|---|---|
| 5,016,244 A | 5/1991 | Massey et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 5,793,762 A | 8/1998 | Penners et al. | |
| 6,119,160 A | 9/2000 | Zhang et al. | |
| 6,148,074 A | 11/2000 | Milavsky et al. | |
| 6,148,405 A * | 11/2000 | Liao et al. | 726/2 |
| 6,230,012 B1 | 5/2001 | Wilkie et al. | |
| 6,339,830 B1 | 1/2002 | See et al. | |
| 6,377,982 B1 | 4/2002 | Rai et al. | |
| 6,466,964 B1 * | 10/2002 | Leung et al. | 709/202 |
| 6,487,605 B1 | 11/2002 | Leung | |
| 6,535,493 B1 | 3/2003 | Lee et al. | |
| 6,560,217 B1 | 5/2003 | Peirce, Jr. et al. | |
| 6,728,536 B1 | 4/2004 | Basilier et al. | |
| 6,760,444 B1 * | 7/2004 | Leung | 380/270 |
| 6,785,823 B1 | 8/2004 | Abrol et al. | |
| 6,795,857 B1 | 9/2004 | Leung et al. | |
| 6,879,690 B2 | 4/2005 | Faccin et al. | |
| 6,907,016 B2 | 6/2005 | Madour et al. | |
| 6,947,725 B2 | 9/2005 | Aura | |
| 6,956,846 B2 | 10/2005 | Lewis et al. | |
| 6,980,802 B2 * | 12/2005 | Jung | 455/436 |
| 7,003,282 B1 * | 2/2006 | Ekberg | 455/411 |
| 7,039,404 B2 * | 5/2006 | Das et al. | 455/435.1 |
| 7,042,879 B2 * | 5/2006 | Eschbach et al. | 370/392 |
| 7,061,887 B2 * | 6/2006 | Fan | 370/331 |
| 7,065,067 B2 * | 6/2006 | Song et al. | 370/338 |
| 7,073,066 B1 * | 7/2006 | Nessett | 713/181 |
| 7,107,051 B1 * | 9/2006 | Walker | 455/432.1 |
| 7,107,620 B2 * | 9/2006 | Haverinen et al. | 726/29 |
| 7,158,777 B2 * | 1/2007 | Lee et al. | 455/411 |
| 7,168,090 B2 * | 1/2007 | Leung | 726/4 |
| 7,174,018 B1 * | 2/2007 | Patil et al. | 380/258 |
| 7,181,196 B2 | 2/2007 | Patel | |
| 7,218,609 B2 | 5/2007 | Borella et al. | |
| 7,224,673 B1 * | 5/2007 | Leung et al. | 370/328 |
| 7,286,520 B2 | 10/2007 | Takeda et al. | |
| 7,298,847 B2 | 11/2007 | Jing et al. | |
| 7,320,070 B2 | 1/2008 | Baum | |
| 7,389,412 B2 * | 6/2008 | Sharma et al. | 713/153 |
| 7,409,549 B1 * | 8/2008 | Leung et al. | 713/168 |
| 7,475,241 B2 * | 1/2009 | Patel et al. | 713/155 |
| 7,502,331 B2 * | 3/2009 | Dommety et al. | 370/254 |
| 7,626,963 B2 | 12/2009 | Patel et al. | |
| 7,639,802 B2 | 12/2009 | Gundavelli | |
| 2002/0120844 A1 | 8/2002 | Faccin et al. | |
| 2002/0147820 A1 * | 10/2002 | Yokote | 709/229 |
| 2003/0005280 A1 * | 1/2003 | Bobde et al. | 713/150 |
| 2003/0028763 A1 | 2/2003 | Malinen et al. | |
| 2003/0069990 A1 | 4/2003 | D'Annunzio et al. | |
| 2003/0115468 A1 | 6/2003 | Aull et al. | |
| 2004/0103282 A1 | 5/2004 | Meier et al. | |
| 2004/0114558 A1 | 6/2004 | Krishnamurthi et al. | |
| 2004/0162105 A1 | 8/2004 | Reddy et al. | |
| 2004/0234075 A1 | 11/2004 | Leung | |
| 2005/0010780 A1 | 1/2005 | Kane et al. | |
| 2005/0025091 A1 * | 2/2005 | Patel et al. | 370/328 |
| 2005/0083905 A1 | 4/2005 | Nishida et al. | |
| 2005/0102522 A1 | 5/2005 | Kanda | |
| 2005/0135622 A1 | 6/2005 | Fors et al. | |
| 2005/0135624 A1 | 6/2005 | Tsai et al. | |
| 2005/0138355 A1 | 6/2005 | Chen et al. | |
| 2005/0177515 A1 | 8/2005 | Kalavade et al. | |
| 2005/0177723 A1 | 8/2005 | Huang et al. | |
| 2006/0046693 A1 | 3/2006 | Tran et al. | |
| 2006/0072759 A1 | 4/2006 | Gundavelli et al. | |
| 2006/0104247 A1 | 5/2006 | Dommety et al. | |
| 2007/0091843 A1 | 4/2007 | Patel et al. | |
| 2007/0124592 A1 | 5/2007 | Oyama | |
| 2007/0230453 A1 | 10/2007 | Giaretta et al. | |
| 2007/0274266 A1 | 11/2007 | Oyama et al. | |
| 2009/0144809 A1 | 6/2009 | Dommety et al. | |

FOREIGN PATENT DOCUMENTS

| | | |
|---|---|---|
| EP | 1 139 634 | 10/2001 |
| WO | WO 01/76134 | 10/2001 |
| WO | WO 02/069605 | 9/2002 |

OTHER PUBLICATIONS

S. Glass et al, Network Working Group Request for Comments: 2977, pp. 1-28, The Internet Society, Oct. 2000.*

Sufatrio, Kwok Yan Lam, Mobile IP Registration Protocol: A Security Attack and New Secure Minimal Public-Key Based Authentication, pp. 364-369, Jun. 1999.*

Charles E Perkins, "Mobile IP", pp. 66-82, IEEE Communications Magazine, May 2002.*

C. Perkins, Ed. RFC 3344, "IP Mobility Support for IPv4," Aug. 2002.

G. Zorn, RFC 2759, "Microsoft PPP CHAP Extensions, Version 2," Jan. 2000.

G. Dommety, et al. RFC 3115, "Mobile IP Vendor/Organization-Specific Extensions," Apr. 2001.

G. Zorn, RFC 2548, "Microsoft Vendor-specific RADIUS Attributes," Mar. 1999.

C. Perkins, et al., RFC 3012, "Mobile IPv4 Challenge/Response Extensions," Nov. 2000.

C. Perkins, et al., Internet Draft, "AAA Registration Keys for Mobile IP," draft-ietf-mobileip-aaa-key-13.txt, Jun. 22, 2003.

C. Perkins, et al., Internet Draft, "AAA Registration Keys for Mobile IP," draft-ietf-mobileip-aaa-key-10.txt, Oct. 23, 2002.

S. Jacobs, et al., Internet Draft, "Mobile IP Public Key Based Authentication," draft-jacobs-mobileip-pki-auth-03.txt, Jul. 9, 2001.

A. Patel, et al., U.S. Appl. No. 10/635,882, "Methods and Apparatus for Dynamic Session Key Generation and Rekeying in Mobile IP," filed Aug. 5, 2003.

S. Gundavelli, et al., U.S. Appl. No. 10/951,499, "Methods and Apparatus for Bootstrapping Mobile-Foreign and Foreign-Home Authentication Keys in Mobile IP," filed Sep. 27, 2004.

G. Dommety, et al. U.S. Appl. No. 10/992,435, "Infrastructure-less Bootstrapping: Trustless Bootstrapping to Enable Mobility for Mobile Devices," filed Nov. 17, 2004.

International Search Report dated Jun. 18, 2004 from the related International Application No. PCT/US 03/36850.

C. Perkins, "Mobile IP and Security Issue: An Overview," Nokia, U.S., Oct. 25, 1999, pp. 131-148, XP010514313.

K. Sufatrio, et al., "Mobile IP Registration Protocol: A Security Attack and New Secure Minimal Public-Key Based Authentication, Parallel Architectures, Algorithms, and Networks," 1999 (I-Span '99) proceedings. Fourth International Symposium, Perth/Fremantle, Australia, Jun. 23-25, 1999, Los Alamitos, California, IEEE pp. 364-369, XP010341845.

S. Jacobs, "Security of Current Mobile IP Solutions," MILCOM 97 Proceedings, Monterey, California, Nov. 2-5, 1997, IEEE pp. 1122-1128, XP010260752.

S. Jacobs, Internet Draft, "Mobile IP Public Key Based Authentication," Aug. 1, 1998, pp. 1-27, XP002285008.

Release notes for 3Com Corporation, "Conducting a Redundant Route for Network Resiliency," Mar. 1994, *NET Builder Family Bridge/Router* pp. 26-29.

J. Moy, RFC 1247 "OSPF Version 2," Jul. 19, 1991.

D. Oran, RFC 1142 "OSI IS-IS Intra-domain Routing Protocol," Feb. 1990.

Uyless Black, "TCP/IP and Related Protocols," 1992, *McGraw-Hill, Inc.*, pp. 226-249.

T. Li, et al., RFC 2281 "Cisco Hot Standby Router Protocol (HSRP)," Mar. 1998.

Chambless, et al., "Home Agent Redundancy Protocol (HARP)," Oct. 27, 1997.

C. Perkins, "*IP Mobility Support*," RFC 2002, IBM Corporation, Oct. 1996.

"Mobile IP," Release 12.0(1)T, pp. 1-55.
Montenegro, G., RFC 2344, "Reverse Tunneling for Mobile IP," Sun Microsystems, Inc., pp. 1-19, May 1998.
D. Harkins and D. Carrel, "The Internet Key Exchange (IKE)," Cisco Systems, pp. 1-33, Jun. 1998.
D. Cong and M. Hamlen, and C. Perkins, RFC 2006, "The Definitions of Managed Objects for IP Mobility Support using SMIv2," Motorola and IBM, pp. 1-52, Oct. 1996.
D. Carrel and Lol Grant, "The TACACS+ Protocol," Network Working Group, Internet-Draft, Cisco Systems, pp. 1-42, Jan. 1997.
C. Rigney, RFC 2139 "RADIUS Accounting,", Livingston, pp. 1-25, Apr. 1997.
C. Rigney, et al., RFC 2138, "Remote Authentication Dial in User Service (RADIUS)," pp. 1-65 Apr. 1997.
J. Kohl, et al., RFC 1510, "The Kerberos Network Authentication Service (V5)" 112 pages, Sep. 1993.
C. Perkins, Ed., RFC 3220, "IP Mobility Support for IPv4" 76 pages, Jan. 2002.
C. Finseth, RFC 1492, "An Access Control Protocol, Sometimes Called TACACS," 21 pages, Jul. 1993.
C. Perkins, et al., "AAA Registration Keys for Mobile IP," Internet Draft, http://www.ietf.org/proceedings/00jul/I-D/mobileip-aaa-key-01.txt, printed from the internet Jun. 17, 2005.
U.S. Office Action mailed Mar. 13, 2007 from U.S. Appl. No. 10/635,882.
European Office Action, dated Sep. 6, 2006, from corresponding European Patent Application No. 03789813.7 5 pgs.
Rigney et al., "Remote Authentication Dial in User Service (RADIUS)", RFC 2865, Jun. 2000 (76 pages).
Aboba et al., "The Network Access Identifier", RFC 2486, Jan. 1999 (8 pages).
Calhoun et al., "Mobile IP Network Access Identifier Extension for IPv4", RFC 2794, Mar. 2000 (9 pages).
D. Eastlake "DNS Security Operational Considerations", RFC 2541, Mar. 1999 (7 pages).
Johnson et al., "Mobility Support in IPv6", RFC 3775, Jun. 2004 (165 pages).
Haverinen et al., "Extensible Authentication Protocol Method for GSM Subscriber Identity Modules (EAPSIM), "Internet Draft, Dec. 21, 2004, 85 pgs.
U.S. Office Action dated Aug. 20, 2007 from related U.S. Appl. No. 10/635,882, 15 pgs.
K. Leung et al. U.S. Appl. No. 10/866,654, "Mobile IP Authentication" filed Jun. 10, 2004; Publ. 2004/0234075.
International Search Report and Written Opinion dated May 21, 2007, from corresponding International Application No. PCT/US06/41511.
Calhoun et al., "Diameter Base Protocol," RFC 3588, Sep. 2003 (133 pgs).
C. Perkins et al., "Authentication, Authorization, and Accounting (AAA) Registration Keys for Mobile IPv4," RFC 3957, Mar. 2005, (27 pgs.).
U.S. Office Action dated Feb. 5, 2008 from related U.S. Appl. No. 10/635,882, 15 pgs.
U.S. Office Action dated Mar. 3, 2008 from related U.S. Appl. No. 11/258,720, 14 pages.
U.S. Office Action dated Mar. 17, 2008 from related U.S. Appl. No. 10/992,435, 15 pages.
U.S. Office Action dated Aug. 6, 2008 from related U.S. Appl. No. 11/258,720, 15 pages.
Notice of Allowance and Allowed Claims dated Aug. 29, 2008 from related U.S. Appl. No. 10/635,882, 17 pages.
U.S. Office Action dated Oct. 14, 2008 from U.S. Appl. No. 10/951,499.
Notice of Allowance and Allowed Claims dated Oct. 23, 2008 from U.S. Appl. No. 10/992,435.
Montenegro, G., RFC 2344, "Reverse Tunneling for Mobile IP," Sun Microsystems, Inc., pp. 1-19, May 1998.
D. Harkins and D. Carrel, "The Internet Key Exchange (IKE)," Cisco Systems, pp. 1-33, Jun. 1998.
D. Cong and M. Hamlen, and C. Perkins, RFC 2006, "The Definitions of Managed Objects for IP Mobility Support using SMIv2, " Motorola and IBM, pp. 1-52, Oct. 1996.
D. Carrel and Lol Grant, "The TACACS+ Protocol," Network Working Group, Internet-Draft, Cisco Systems, pp. 1-42, Jan. 1997.
C. Rigney, RFC 2139 "RADIUS Accounting, " Livingston, pp. 1-25, Apr. 1997.
C. Rigney, et al., RFC 2138, "Remote Authentication Dial in User Service (RADIUS)," pp. 1-65 Apr. 1997.
J. Kohl, et al., RFC 1510, "The Kerberos Network Authentication Service (V5)" 112 pages, Sep. 1993.
C. Perkins, Ed., RFC 3220, "IP Mobility Support for IPv4" 76 pages, Jan. 2002.
C. Finseth, RFC 1492, "An Access Control Protocol, Sometimes Called TACACS," 21 pages, Jul. 1993.
C. Perkins, et al., "AAA Registration Keys for Mobile IP," Internet Draft, http://www.ietf.org/proceedings/00jul/I-D/mobileip-aaa-key-01.txt, printed from the internet Jun. 17, 2005.
Release notes for 3Com Corporation, "Conducting a Redundant Route for Network Resiliency," Mar. 1994, *NET Builder Family Bridge/Router* pp. 26-29.
D. Oran, RFC 1142 "OSI IS-IS Intra-domain Routing Protocol," Feb. 1990.
Uyless Black, "TCP/IP and Related Protocols," 1992, *McGraw-Hill, Inc.*, pp. 226-249.
T. Li, et al., RFC 2281 "Cisco Hot Standby Router Protocol (HSRP)," Mar. 1998.
Chambless, et al., "Home Agent Redundancy Protocol (HARP)," Oct. 27, 1997.
C. Perkins, "*IP Mobility Support*," RFC 2002, IBM Corporation, Oct. 1996.
CN Second Office Action dated Feb. 20, 2009, from CN Appl. No. 200380103939.0.
CN Third Office Action dated Jun. 19, 2009, from CN Appl. No. 200380103939.0.
EP Office Action dated Sep. 6, 2006, from EP Appl. No. 03789813.7.
EP Extended Search Report dated Jan. 9, 2009, from EP Appl. No. 06817346.7.
US Notice of Allowance and Allowed Claims dated Aug. 12, 2009, from U.S. Appl. No. 10/951,499.
US Office Action mailed Feb. 13, 2009, from U.S. Appl. No. 11/258,720.
US Notice of Allowance and Allowed Claims dated Jul. 24, 2009, from U.S. Appl. No. 11/258,720.
Haverinen, et al., "Authentication and Key Generation for Mobile IP using GSM Authentication and Roaming", ICC 2001. 2001 IEEE International Conference on Communications, New York: IEEE; US vol. 8, Jun. 11, 2001, pp. 2453-2457, XP010553567.
Haverinen, et al., GSM SIM Authentication and Key Generation for Mobile IP draft-haverinen-mobileip-gsmsim-02.txt, Mobile IP Working Group, Nokia, Internet Draft, Apr. 2001, 20 pgs.
AU Office Action dated May 2, 2008, from AU Appl. No. 2003294330.
CA Office Action dated Jan. 6, 2009, from CA Appl. No. 2,506,670.
CN Office Action dated Sep. 5, 2008, from CN Appl. No. 200380103939.0.

* cited by examiner

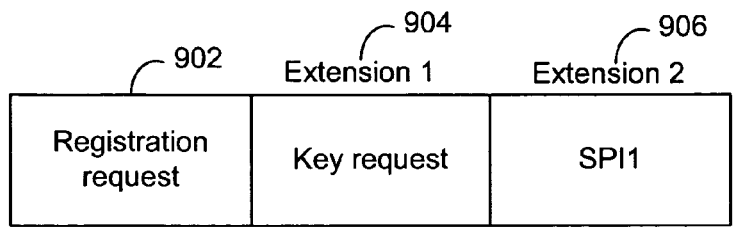
*FIG. 9*
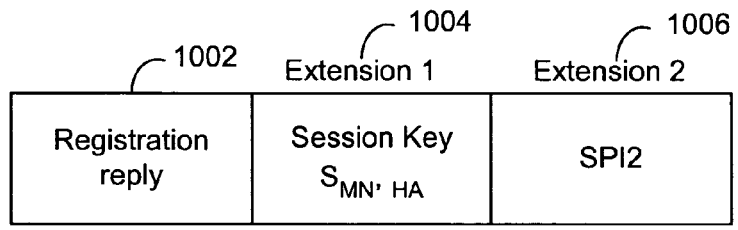
*FIG. 10*
Security Association Table
| MN | SPI2 | Session Key $_{MN, HA}$ | Encrypted Session Key |
|---|---|---|---|
|  |  |  |  |
|  |  |  |  |
|  |  |  |  |
|  |  |  |  |
*FIG. 11*

METHODS AND APPARATUS FOR
AUTHENTICATING MOBILITY ENTITIES
USING KERBEROS

BACKGROUND OF THE INVENTION

1. Field of the Invention

The present invention relates to Mobile IP network technology. More particularly, the present invention relates to Mobile IP registration and authentication of Mobility Entities using dynamically generated keys.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one network and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC 3220, "IP Mobility Support for IPv4" of the Network Working Group, C. Perkins, Ed., January 2002. Mobile IP is also described in the text "Mobile IP, The Internet Unplugged" by J. Solomon, Prentice Hall, 1998. Both of these references are incorporated herein by reference in their entireties and for all purposes.

The Mobile IP process and environment are illustrated in FIG. 1. A Mobile IP environment 100 includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R1 125. Router R1 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of the message from the correspondent node 155 are forwarded over the Internet 105 to the router R2 125 and ultimately to the home agent 115.

From the home agent's 115 mobility binding table, the home agent 115 recognizes that the mobile node 110 is no longer attached to the home network segment 135. The home agent 115 then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 strips the encapsulation and forwards the message to the mobile node 110 on the remote network segment 140. The packet forwarding mechanism implemented by the home agent 115 to the foreign agent 120 is often referred to as "tunneling."

As set forth above, under current standards as set forth in RFC 2002 and RFC 3220, a Mobile Node registers with a Home Agent each time it roams to a new location. The Home Agent validates (i.e., authenticates) its communication with the Mobile Node based upon a security association. Specifically, the registration request that is sent by a Mobile Node typically identifies a Security Parameter Index (SPI), which is an identifier that specifies a security association, or "row" in a security-association table, that a receiver should use to interpret a received packet. The security-association defines the key and the algorithm to be applied during the authentication process. The security associations for multiple mobile nodes are typically stored on an external server and sent to the Home Agent when a particular Mobile Node registers with the Home Agent.

The external server typically is a centralized server, which is capable of storing and updating accounting information for multiple mobile nodes as well as multiple network devices. In addition, the centralized server may provide further services. By way of example, the centralized server may provide authentication services and/or authorization services. While authentication determines "who" an entity is, authorization determines what services a user is allowed to perform, or access. A class of servers known as "AAA" or triple-A servers may be employed. The AAA represents authentication, authorization, and accounting. Various protocols such as the Remote Authentication Dial In User Service (RADIUS) and TACACS+ may be implemented to provide such a server. Note that the Home Agent or Foreign Agent providing accounting information to the server must provide communications in formats required by the AAA server protocol. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

As set forth above, a Home Agent can authenticate a registration request sent by a Mobile Node or a registration reply sent to a Mobile Node. In order to accomplish this authentication, a key that is shared by the Mobile Node and the Home Agent is typically pre-configured. Thus, the shared key is statically configured and therefore both the Mobile Node and the Home Agent are configured with this shared key. While static configuration is simple and efficient, the pre-configured key shared by the Mobile Node and the Home Agent is exposed over time, enabling the key to be reverse engineered. Thus, the standard mechanism for authenticating registration request and reply packets is insecure.

The Kerberos Network Authentication Service is described in RFC 1510, entitled "The Kerberos Network Authentication Service (V5)," by Kohl et al, September 1993. Kerberos. Kerberos enables keys to be dynamically generated for communication between two different nodes, providing a secure infrastructure for communication between the two nodes. While Kerberos has been widely deployed in enterprise systems, Kerberos has not been employed in a Mobile IP environment.

In view of the above, it would be desirable if a more secure, dynamic mechanism for authenticating communication in a Mobile IP environment were implemented.

SUMMARY OF THE INVENTION

Methods and apparatus are disclosed for authenticating mobile entities using a network authentication service such as Kerberos. Mobile entities may include, for example, Mobile Nodes, Home Agents, Foreign Agents, and Access Points. This is accomplished, in part, through the use of a key distribution center capable of dynamically generating keys to be used in the authentication process. In this manner, the present invention supports a secure mechanism for authenticating registration messages in a Mobile IP environment.

In accordance with one aspect of the invention, a first mobility entity establishes communication with a key distribution center to obtain a first dynamically generated key shared between the first mobility entity and the key distribution center. The first mobility entity obtain a shared session key from the key distribution center using the first dynamically generated key shared between the first mobility entity and the key distribution center, the shared session key being a dynamically generated key to be shared by the first mobility entity and a second mobility entity. The shared session key is then provided to the second mobility entity. Accordingly, the first mobility entity and the second mobility entity may authenticate one another using the shared session key.

In accordance with another aspect of the invention, a key distribution center generates a session key between the key distribution center and an access point. Once the session key between the key distribution center and the access point is transmitted to the access point, the access point may retrieve a second dynamically generated session key to be shared between the access point and a Mobile Node which is then transmitted to the Mobile Node, enabling the Mobile Node to connect to the network.

In accordance with another aspect of the invention, either the Mobile Node or its Home Agent retrieves a session key between the key distribution center and the access point, enabling a shared session key between the Home Agent and the Mobile Node to be obtained. The Mobile Node (or Home Agent) then transmits the encrypted shared session key to the Home Agent (or Mobile Node).

In accordance with yet another aspect of the invention, once the shared session key is obtained by both the Home Agent and the Mobile Node, the shared session key is used to authenticate registration messages (e.g., including registration request and reply packets). In this manner, dynamically generated session keys may be used to securely transmit registration messages in a Mobile IP environment.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, registration request and reply packets having the format described herein and provided on appropriate media are part of this invention. As another example, visitor tables and mobility binding tables having the formats described herein are also part of this invention.

These and other features of the present invention will be described in more detail below in the detailed description of the invention and in conjunction with the following figures.

BRIEF DESCRIPTION OF THE DRAWINGS

FIG. 9 is a diagram illustrating an exemplary registration request in accordance with various embodiments of the invention.

FIG. 10 is a diagram illustrating an exemplary registration reply in accordance with various embodiments of the invention.

FIG. 11 is a diagram illustrating an exemplary security association table maintained by a Home Agent in accordance with various embodiments of the invention.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

Figure 1:
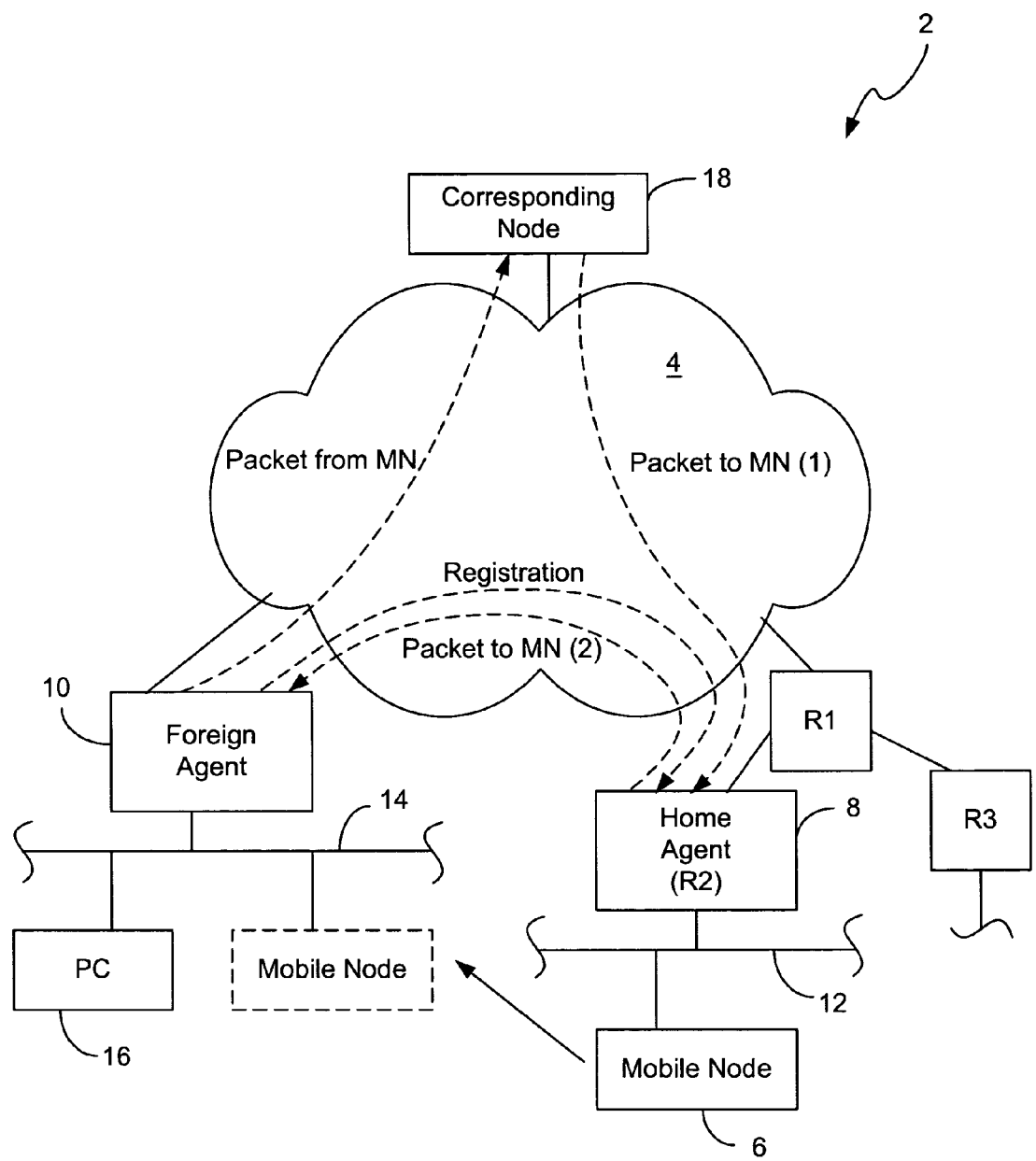
FIG. 1 is a block diagram of a Mobile IP environment.
Figure 2:
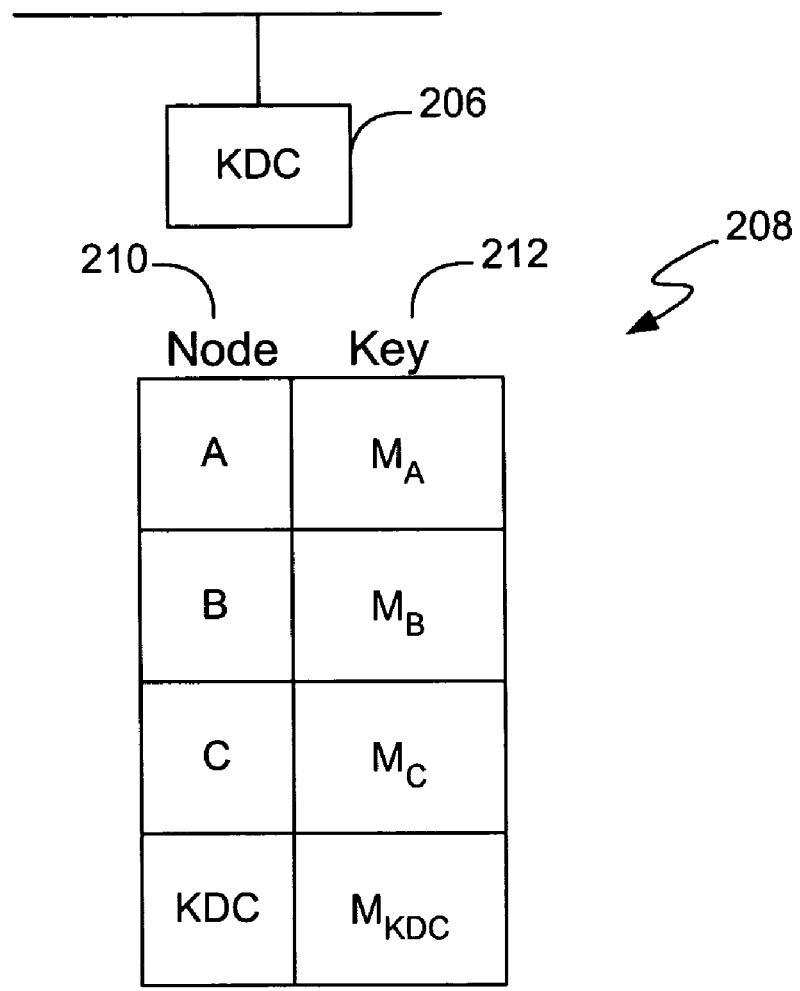
FIG. 2 is a diagram illustrating a standard key distribution center implemented in a network environment.
Figure 2:

FIG. 2 is a diagram illustrating a standard key distribution center implemented in a network environment. When a first node, node A 202, wishes to communicate with a second node, node B 204, a key distribution center (KDC) 206 generates a session key to be shared by the two nodes. A method of generating and distributing this session key will be described in further detail below with reference to FIG. 3. The KDC 206 maintains a list 208 of master keys for each node that is part of the network. Thus, each entry in the list 208 identifies a node 210 and its master key 212. In this example, the list 208 includes a master key for node A, a master key for node B, a master key for additional nodes (e.g., node C), and a master key for the KDC. Once a key is generated, the key may be encrypted using the appropriate master key(s) prior to transmission to a requesting node.

Figure 3:
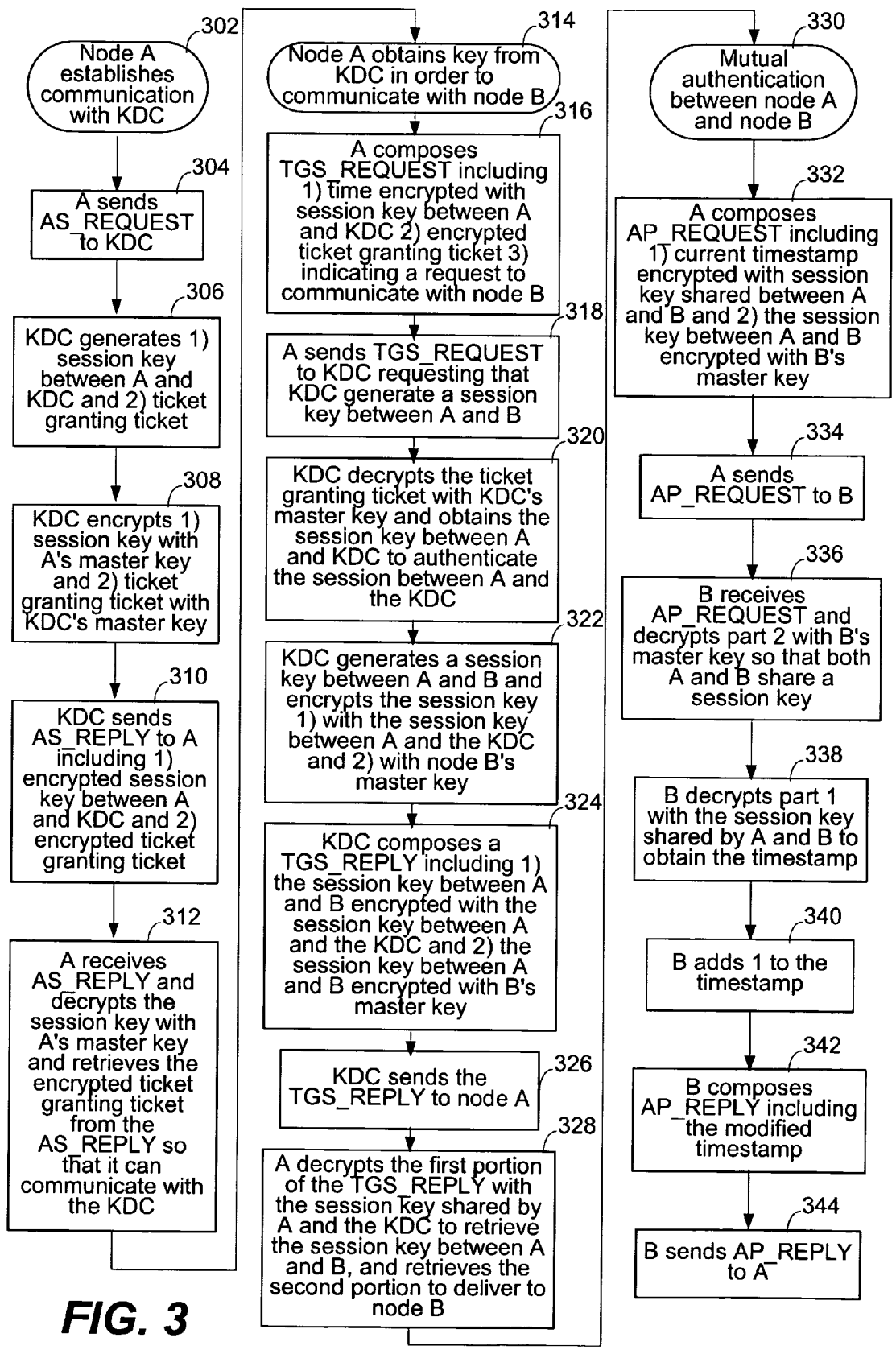
FIG. 3 is a process flow diagram illustrating a process for authenticating communication between two nodes using a dynamically generated session key using Kerberos in a network environment.

FIG. 3 is a process flow diagram illustrating a process for authenticating communication between two nodes using a dynamically generated session key using Kerberos in a network environment. First, the requesting node A establishes communication with the KDC as shown at blocks 302-312. In order to establish communication with the KDC, A sends an AS_REQUEST to the KDC at block 304. The KDC generates a session key between node A and the KDC and a ticket granting ticket at block 306. A ticket granting ticket is generally transmitted by the requesting node to the KDC when the node subsequently obtains a session key from the KDC to be shared by two nodes (e.g., nodes A and B). The KDC encrypts the session key with A's master key and encrypts the ticket granting ticket with KDC's master key at block 308. The KDC then sends an AS_REPLY to A at block 310 including the encrypted session key to be shared between A and the KDC and the encrypted ticket granting ticket. When A receives the AS_REPLY at block 312, it decrypts the session key with A's master key and retrieves the encrypted ticket granting ticket from the AS_REPLY so that it can communicate with the KDC.

Node A then obtains the session key from the KDC in order to communicate with node B as shown at blocks 314-328. Node A composes a TGS_REQUEST at block 316 including the time of day encrypted with the session key between A and the KDC and the encrypted ticket granting ticket. The TGS_REQUEST indicates a request to communicate with node B. A then sends the TGS_REQUEST to the KDC at block 318 requesting that the KDC generate a session key between nodes A and B. Upon receiving the TGS_REQUEST, the KDC decrypts the ticket granting ticket at block 320 and obtains the session key between A and the KDC to authenticate the session between A and the KDC. The KDC then generates a session key between A and B and encrypts the session key twice, encrypting it separately with the session key between A and the KDC, and separately encrypting it with node B's master key at block 322. The KDC composes a TGS_REPLY at block 324 including the session key between A and B encrypted with the session key between A and the KDC, and including the session key between A and B encrypted with B's master key. The KDC then sends the TGS_REPLY at block 326 to node A. Upon receiving the TGS_REPLY at block 328, A decrypts the first portion of the TGS_REPLY with the session key shared by A and the KDC to retrieve the session key between A and B.

Nodes A and B then perform mutual authentication as shown at blocks 330-344. First, A composes an AP_REQUEST at block 332 including the current timestamp encrypted with the session key shared between A and B, and including the session key between A and B encrypted with B's master key (previously obtained from the TGS_REPLY). A then sends the AP_REQUEST at block 334 to node B. When B receives the AP_REQUEST at block 336, it decrypts the second portion of the AP_REQUEST with B's master key so that both A and B share a session key. B then decrypts the first portion of the AP_REQUEST with the newly obtained session key shared by A and B to obtain the timestamp at block 338. B then adds 1 to the timestamp at block 340, composes an AP_REPLY including the modified timestamp at block 342, and sends the AP_REPLY to node A at block 344.

Figure 4:
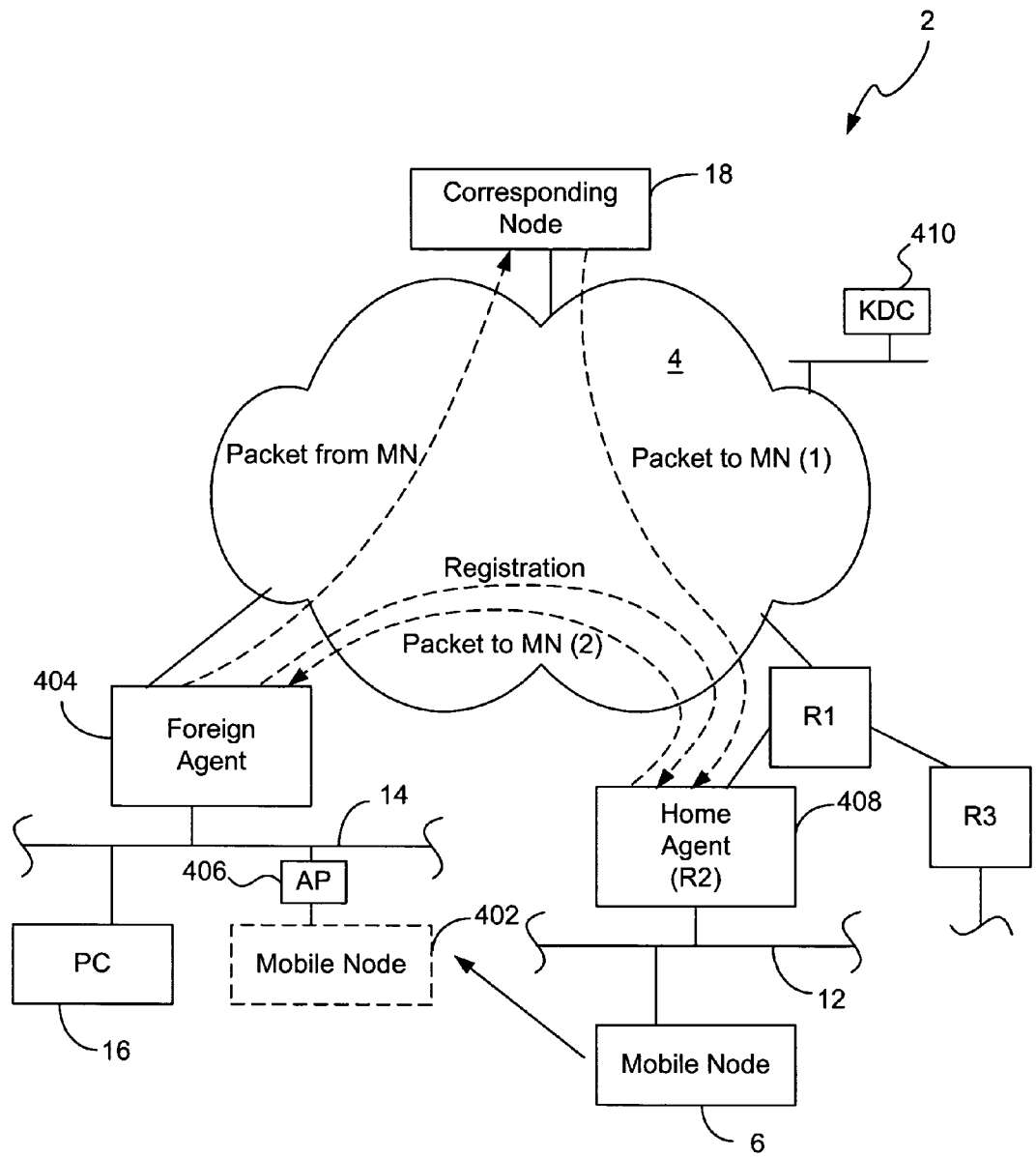
FIG. 4 is a system diagram illustrating a system in which a key distribution center is used to dynamically generate a session key for use in authenticating registration request and reply packets in a Mobile IF environment in accordance with various embodiments of the invention.

FIG. 4 is a system diagram illustrating a system in which a key distribution center is used to dynamically generate a session key for use in authenticating registration request and reply packets in a Mobile IP environment in accordance with various embodiments of the invention. As shown, a Mobile Node 402 roams to a location within a network. In this example, the Mobile Node 402 roams to a Foreign Agent 404 by attaching to an Access Point 406. By way of example, in a wireless network, the Access Points 210 and 212 may have an antenna and receiver for receiving packets. As yet another example, the Access Points 210 and 212 may designate connection points in a non-wireless network. In order for the Mobile Node 402 to register with a Home Agent 408, both the Mobile Node 402 and the Home Agent 408 obtain a shared key from the KDC 410. One method for distributing shared key(s) dynamically generated by the KDC 410 will be described in further detail below with reference to FIG. 6 and FIG. 7.

Figure 5:
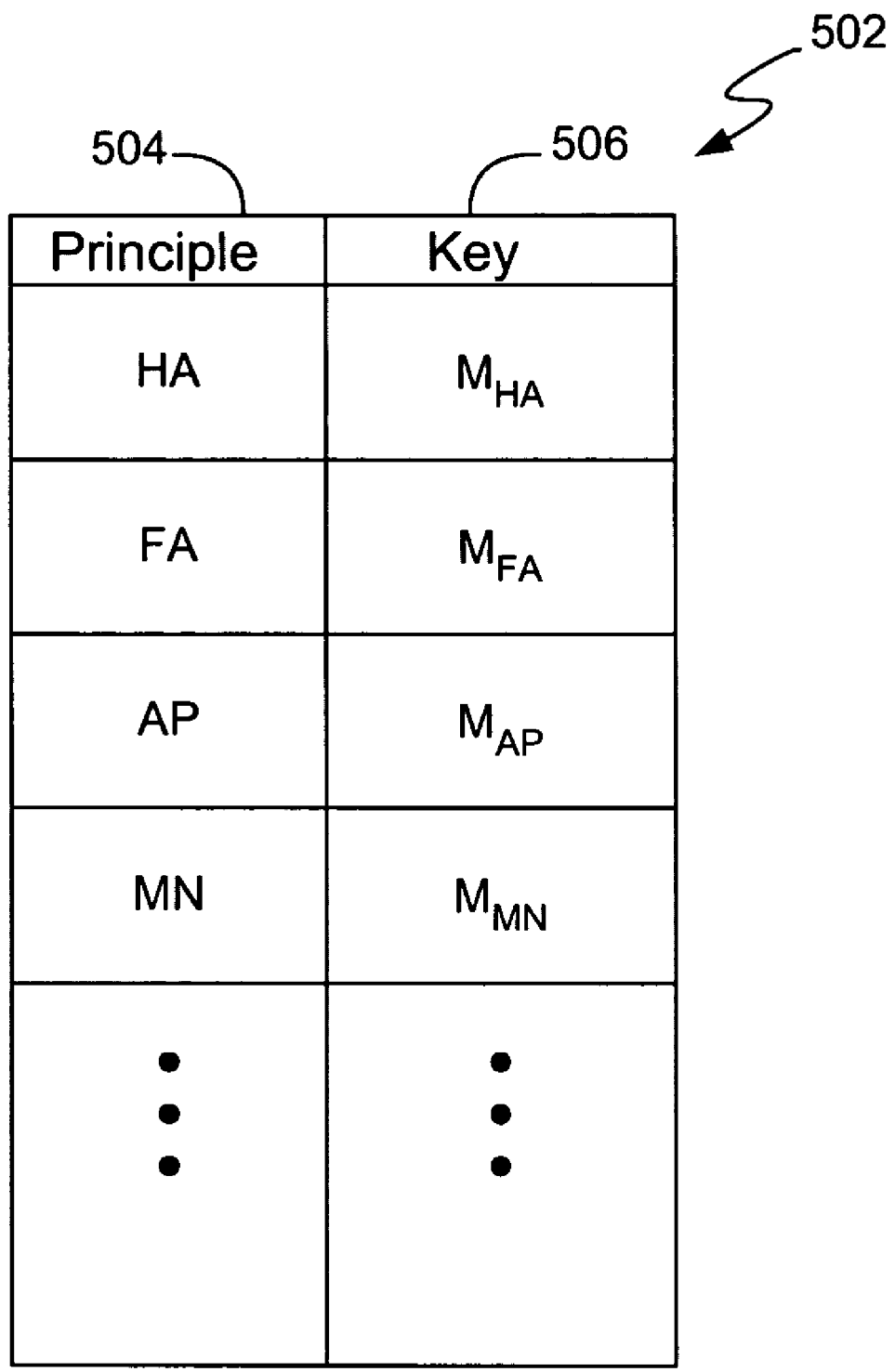
FIG. 5 is a diagram illustrating a list of master keys maintained by a key distribution center implemented in accordance with various embodiments of the invention.

FIG. 5 is a diagram illustrating a list of master keys maintained by a key distribution center implemented in accordance with various embodiments of the invention. As will be described in further detail below with reference to FIGS. 6 and 7, the KDC maintains a list 502 of master keys associated with each Mobile IP principle. Specifically, the list 502 of master keys includes a plurality of entries, where each entry identifies a principle 504 and the associated master key 506. As shown, the list 504 includes master keys for the Home Agent, Access Point, and Mobile Node, and may also include a master key for the Foreign Agent.

The present invention enables registration request and reply packets to be authenticated using dynamically generated session key(s). One method for authenticating registration messages will be described in further detail below with reference to FIGS. 6-8. In the exemplary description that follows, the methods are implemented in the Kerberos protocol. However, it is important to note that other network authentication protocols may be used to enable a key distribution center to dynamically generate and distribute session key(s) for use in a Mobile IP environment.

Figure 6:
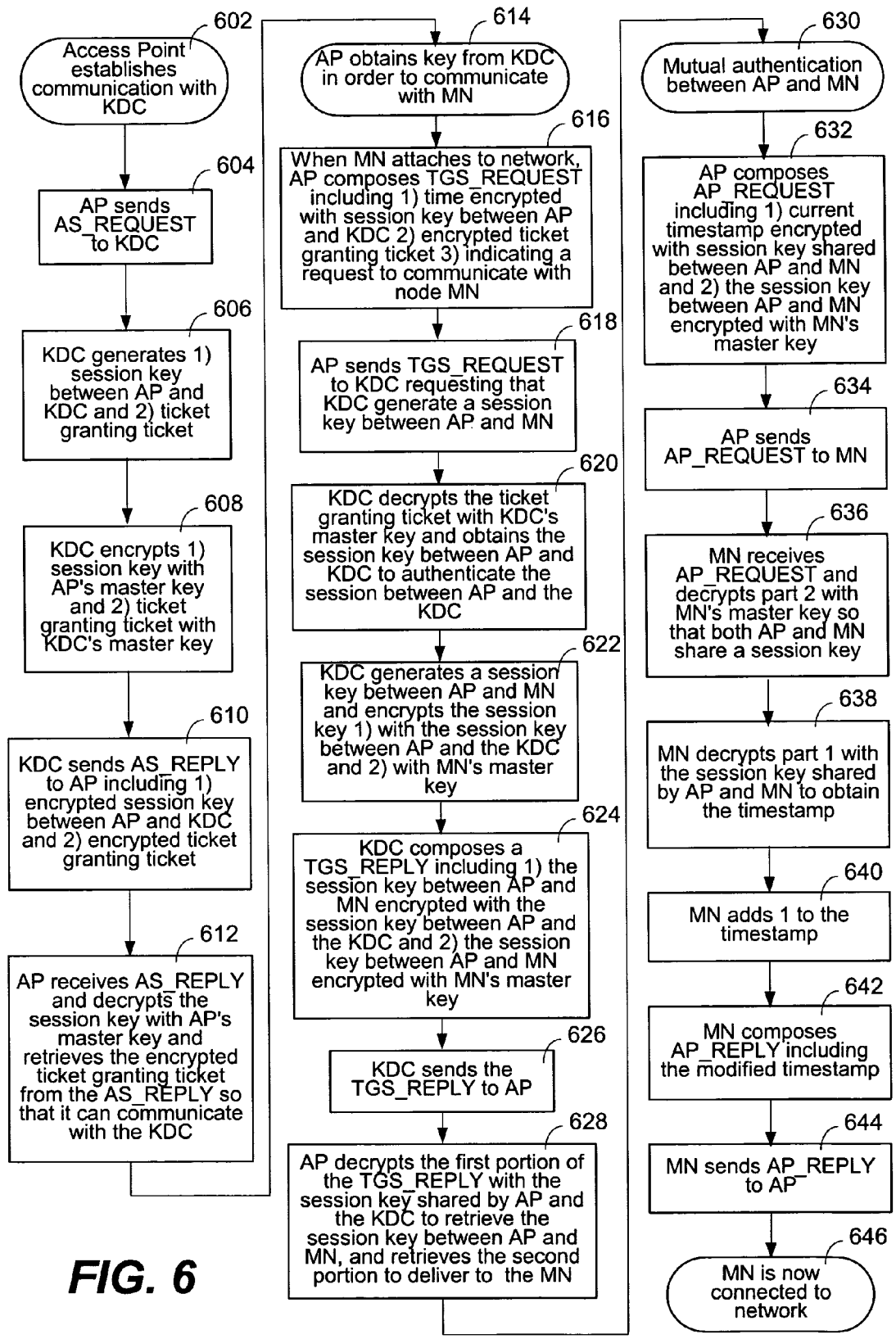
FIG. 6 is a process flow diagram illustrating a method of establishing communication between a Mobile Node and an Access Point in accordance with various embodiments of the invention.

FIG. 6 is a process flow diagram illustrating a method of establishing communication between a Mobile Node and an Access Point in accordance with various embodiments of the invention. The authentication that occurs between the Access Point and the Mobile Node as described below with reference to FIG. 6 is optional, but may be performed in order to authenticate communication between the Access Point and the Mobile Node. First, the Access Point establishes communication with the KDC as shown at blocks 602-612. As shown, the Access Point sends an AS_REQUEST to the KDC at block 604. In response, the KDC generates a session key between the Access Point and the KDC, and generates a ticket granting ticket at block 606 that can be subsequently transmitted to the KDC when the Access Point requests communication with a particular Mobile Node. The KDC encrypts the session key with the Access Point's master key, and encrypts the ticket granting ticket with the KDC's master key at block 608. The KDC then composes and sends an AS_REPLY to the Access Point including the encrypted session key between the Access Point and the KDC, and the encrypted ticket granting ticket at block 610. When the Access Point receives the AS_REPLY at block 612, it decrypts the session key with the Access Point's master key and retrieves the encrypted ticket granting ticket from the AS_REPLY so that it can communicate with the KDC.

The Access Point then obtains the shared session key from the KDC in order to communicate with the Mobile Node as shown at blocks 614-628. When the Mobile Node attaches to the network (via the Access Point), the Access Point composes a TGS_REQUEST at block 616 including the time of day encrypted with the session key between the Access Point and the KDC, and the encrypted ticket granting ticket previously obtained in the AS_REPLY received from the KDC. In addition, the TGS_REQUEST packet indicates a request to communicate with the Mobile Node. Once the TGS_REQUEST packet is composed, the Access Point sends the TGS_REQUEST to the KDC requesting that the KDC generate a session key between the Access Point and the Mobile Node at block 618. When the KDC receives the TGS_REQUEST, it decrypts the ticket granting ticket with the KDC's master key and obtains the session key between the Access Point and the KDC to authenticate the session between the Access Point and the KDC at block 620. The KDC then generates a shared session key between the Access Point and the Mobile Node and encrypts it twice, once with the session key between the Access Point and the KDC, and separately encrypted with the Mobile Node's master key at block 622. The KDC then composes a TGS_REPLY at block 624 including both encrypted versions of the session key between the Access Point and the Mobile Node. Specifically, the TGS_REPLY includes a first portion including the session key between the Access Point and the Mobile Node encrypted with the session key between the Access Point and the KDC, and a second portion including the session key between the Access Point and the Mobile Node encrypted with the Mobile Node's master key. The KDC then sends the TGS_REPLY to the Access Point at block 626. Upon receipt of the TGS_REPLY at block 628, the Access Point decrypts the first portion of the TGS_REPLY with the session key shared by the Access Point and the Mobile Node to obtain the shared session key, and retrieves the second portion to deliver to the Mobile Node.

The Access Point and the Mobile Node then perform mutual authentication at blocks 630-646. First, the Access Point composes an AP_REQUEST at block 632 including the current timestamp encrypted with the session key shared by the Access Point and the Mobile Node, and including the session key between the Access Point and the Mobile Node encrypted with the Mobile Node's master key to be subsequently provided to the Mobile Node. The Access Point then sends the AP_REQUEST to the Mobile Node at block 634. The Mobile Node receives the AP_REQUEST at block 636 and decrypts the second portion with the Mobile Node's master key so that both the Access Point and the Mobile Node share a session key. The Mobile Node then decrypts the first portion of the AP_REQUEST at block 638 with the session key shared by the Access Point and the Mobile Node to obtain the timestamp. The Mobile Node adds 1 to the timestamp at block 640, composes an AP_REPLY at block 642 including the modified timestamp, and sends the AP_REPLY to the Access Point at block 644. In this manner, the present invention enables the Mobile Node to connect to the network.

Figure 7:
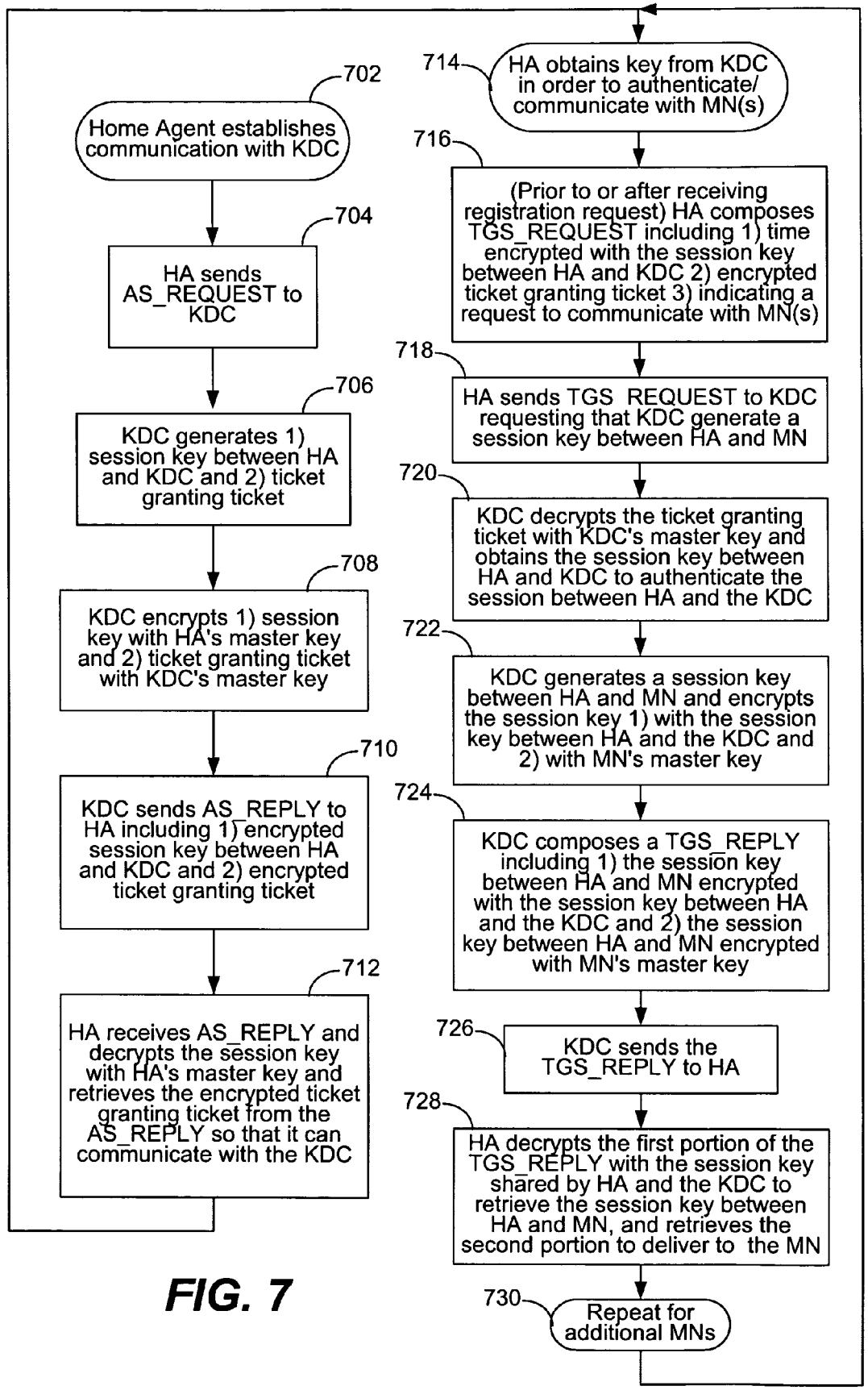
FIG. 7 is a process flow diagram illustrating a method of distributing a shared key between a Home Agent and one or more Mobile Nodes in accordance with various embodiments of the invention.

FIG. 7 is a process flow diagram illustrating a method of distributing a shared key between a Home Agent and one or more Mobile Nodes in accordance with various embodiments of the invention. First, the Home Agent establishes communication with the KDC as shown at blocks 702-712. Specifically, the Home Agent first sends an AS_REQUEST to the KDC at block 704. The KDC generates a session key between the Home Agent and the KDC, and a ticket granting ticket at block 706. The KDC encrypts the session key with the Home Agent's master key, and encrypts the ticket granting ticket with the KDC's master key at block 708. The KDC sends an AS_REPLY at block 710 to the Home Agent including the encrypted session key and the encrypted ticket granting ticket at block 710. When the Home Agent receives the AS_REPLY, it decrypts the session key with the Home Agent's master key and retrieves the encrypted ticket granting ticket from the AS_REPLY so that it can communicate with the KDC as shown at block 712.

The Home Agent then obtains the session key from the KDC in order to authenticate and communicate with the Mobile Node as shown at blocks 714-730. In this example, the Home Agent obtains a session key between the Home Agent and one or more Mobile Nodes prior to receiving a registration request from the Mobile Node(s). In this manner, the Home Agent can expedite the registration process. However, it is important to note that the Home Agent may also obtain the session key after receiving a registration request for that Mobile Node.

As shown at block 716, the Home Agent composes a TGS_REQUEST packet including the time of day encrypted with the session key between the Home Agent and the KDC, and the encrypted ticket granting ticket previously obtained from the AS_REPLY received from the KDC. In addition, the TGS_REQUEST indicates a request to communicate with a specific Mobile Node. The Home Agent sends the TGS_REQUEST to the KDC requesting that the KDC generate a session key between the Home Agent and the Mobile Node at block 718. At 720 the KDC decrypts the ticket granting ticket with the KDC's master key and obtains the session key between the Home Agent and the KDC from the TGS_REQUEST to authenticate the session between the Home Agent and the KDC. The KDC generates a session key between the Home Agent and the Mobile Node and encrypts the session key twice, both with the session key between the Home Agent and the KDC, and separately with the Mobile Node's master key at block 722. The KDC then composes a TGS_REPLY having a first portion including the session key between the Home Agent and the Mobile Node encrypted with the session key between the Home Agent and the KDC, and a second portion including the session key between the Home Agent and the Mobile Node encrypted with the Mobile Node's master key at block 724. The KDC then sends the TGS_REPLY to the Home Agent at block 726. The Home Agent decrypts the first portion of the TGS_REPLY at block 728 with the session key shared by the Home Agent and the KDC to retrieve the session key between the Home Agent and the Mobile Node, and retrieves the second portion of the TGS_REPLY to deliver to the Mobile Node. Steps 714-730 are repeated as shown for additional Mobile Nodes as desired.

As described above with reference to FIG. 7, the Home Agent may initiate the generation of a shared key to be shared by the Home Agent and the Mobile Node. However, it is important to note that the Mobile Node may also initiate the generation of the shared key. As performed by the Home Agent, the Mobile Node may also establish communication with a key distribution center to obtain a first dynamically generated key shared between the Mobile Node and the key distribution center. For instance, the Mobile Node may initiate the generation of the shared key by sending an AS_REQUEST to the KDC to initiate communication with the KDC. The Mobile Node may then obtain a shared session key from the key distribution center using the first dynamically generated key shared between the Mobile Node and the key distribution center, where the shared session key is a dynamically generated key to be shared by the Home Agent and the Mobile Node. The Mobile Node may then provide the shared session key to the Home Agent. The Mobile Node could then compose a TGS_REQUEST to the KDC to obtain the shared session key. Once the shared session key is obtained, the Mobile Node may transmit the shared session key to the Home Agent in a registration request message, or alternatively, via an AP_REQUEST.

Figure 8:
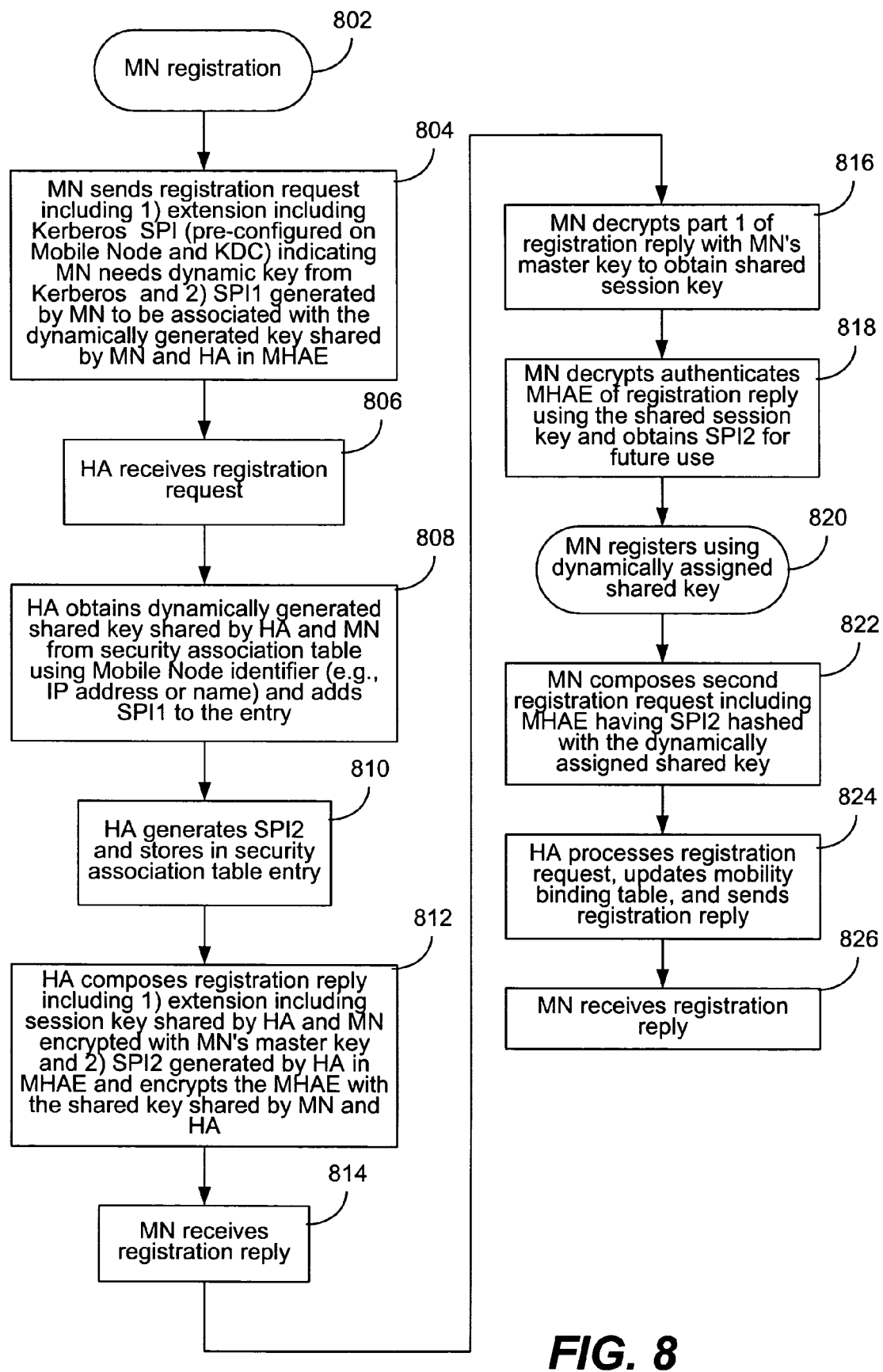
FIG. 8 is a process flow diagram illustrating a registration process using a dynamically generated key in accordance with various embodiments of the invention.

Once both the Home Agent and the Mobile Node have a shared key, the key may be used to securely transmit registration request and reply messages. FIG. 8 is a process flow diagram illustrating a registration process using a dynamically generated key in accordance with various embodiments of the invention. Registration begins at block 802, and the Mobile Node sends a registration request at block 804. In accordance with one embodiment, the registration request includes a first extension including a Kerberos SPI (pre-configured at the Mobile Node and the KDC) indicating that the Mobile Node is requesting a dynamic key from the KDC and a second extension (e.g., MHAE) including a first SPI generated by the Mobile Node that is to be associated with a dynamically generated key shared by the Mobile Node and the Home Agent. When the Home Agent receives a registration request at block 806, it obtains the dynamically generated key shared by the Home Agent and the Mobile Node from the security association table using a Mobile Node identifier (e.g., IP address, name or other identifier) at block 808. The Home Agent then adds the first SPI to the entry in the security association table, thereby mapping the first SPI to the dynamically generated key. The Home Agent then generates a second SPI and stores the second SPI in a security association table entry at block 812 in a security association table maintained by the Home Agent. An exemplary security association table will be described in further detail below with reference to FIG. 11. The Home Agent then composes a registration reply including a first extension including the session key shared by the Home Agent and the Mobile Node encrypted with the Mobile Node's master key, and a second extension (e.g., MHAE) including the second SPI generated by the Home Agent, which is encrypted with the session key shared by the Mobile Node and the Home Agent.

When the Mobile Node receives the registration reply at block 814, it decrypts the first portion of the registration reply with the Mobile Node's master key to obtain the shared session key at block 816. The Mobile Node then decrypts and authenticates the MHAE at block 818 using the shared session key and obtains the second SPI for future use. The Mobile Node then registers with the Mobile Node using the dynamically assigned session key shared between the Home Agent and the Mobile Node as shown at blocks 820-826. Specifically, the Mobile Node composes a second registration request at block 822 including a MHAE having the second SPI encrypted with the dynamically assigned shared key in accordance with RFC 3220. The Home Agent processes the registration request, updates its mobility binding table to include a binding between the Mobile Node identifier (e.g., IP address) and a care-of address, and sends a registration reply at block 824. The Mobile Node receives the registration reply at block 826. Upon successful registration, the Home Agent forwards data packets addressed to the Mobile Node at its care-of address.

FIG. 9 is a diagram illustrating an exemplary registration request in accordance with various embodiments of the invention. As described above, the registration request 902 may indicate that the Mobile Node is requesting a session key between the Mobile Node and the Home Agent. As shown, the registration request 902 includes a first extension 904 indicating that the Mobile Node needs a session key between the Mobile Node and the Home Agent and a second extension 906 (e.g., MHAE) including the first SPI transmitted by the Mobile Node.

FIG. 10 is a diagram illustrating an exemplary registration reply in accordance with various embodiments of the invention. The registration reply 1002 includes a first extension 1004 including the session key between the Mobile Node and the Home Agent and a second extension 1006 including the second SPI generated by the Home Agent corresponding to the session key, as described above. Thus, the registration reply 1002 may be used to transmit the dynamically generated session key as well as the associated SPI.

FIG. 11 is a diagram illustrating an exemplary security association table maintained by a Home Agent in accordance with various embodiments of the invention. The security association table 1102 includes a plurality of entries, each of the entries being associated with a different session. As shown, each entry 1104 identifies a Mobile Node 1106 (e.g., via an IP address or Mobile Node identifier), the second SPI 1108 generated by the Home Agent, the session key 1110 between the Mobile Node and the Home Agent, and the encrypted session key 1112 encrypted with the Mobile Node master key.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents, access points, and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 12:
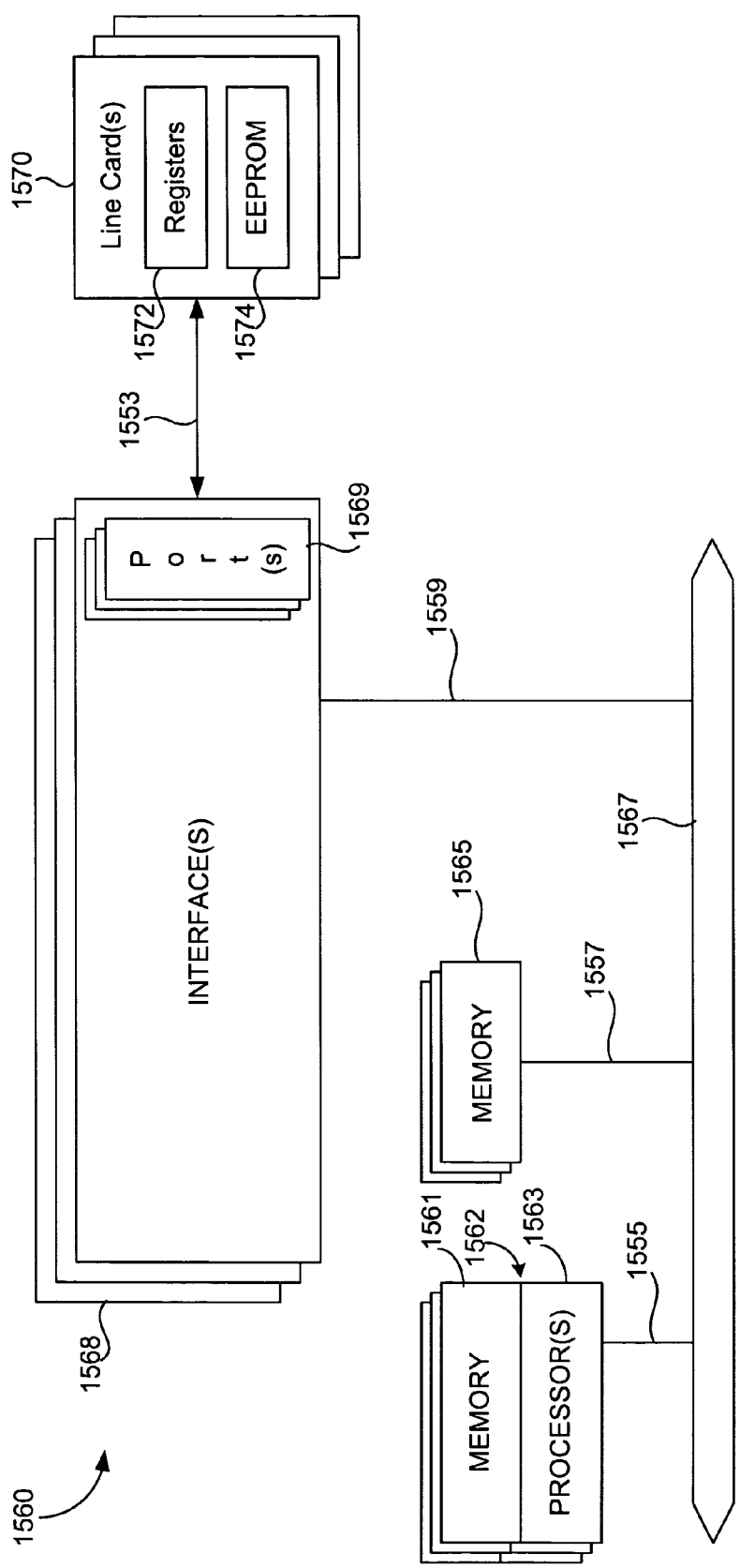
FIG. 12 is a diagram illustrating an exemplary network device in which various embodiments of the invention may be implemented.

Referring now to FIG. 12, a network device 1500 suitable for implementing the techniques of the present invention includes a master central processing unit (CPU) 1505, interfaces 1510, memory 1515 and a bus 1520. When acting under the control of appropriate software or firmware, the CPU 1505 may be responsible for implementing specific functions associated with the functions of a desired network device. For example, when configured as an intermediate router, the CPU 1505 may be responsible for analyzing packets, encapsulating packets, and forwarding packets for transmission to a set-top box. The CPU 1505 preferably accomplishes all these functions under the control of software including an operating system (e.g. Windows NT), and any appropriate applications software.

CPU 1505 may include one or more processors such as those from the Motorola family of microprocessors or the MIPS family of microprocessors. In an alternative embodiment, the processor is specially designed hardware for controlling the operations of network device 1500.

The interfaces 1510 are typically provided as interface cards (sometimes referred to as "line cards"). Generally, they control the sending and receiving of data packets over the network and sometimes support other peripherals used with the network device 1500. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 1505 to efficiently perform routing computations, network diagnostics, security functions, etc.

Although the system shown in FIG. 12 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 1515) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Accordingly, the present embodiments are to be considered as illustrative and not restrictive, and the invention is not to be limited to the details given herein, but may be modified within the scope and equivalents of the appended claims.

What is claimed is:

1. In a Home Agent, a method of authenticating a Mobile Node, comprising:

establishing by the Home Agent communication with a key distribution center to obtain a first dynamically generated key shared between the Home Agent and the key distribution center;

obtaining by the Home Agent a shared session key from the key distribution center using the first dynamically generated key shared between the Home Agent and the key distribution center, the shared session key being a dynamically generated key to be shared by the Home Agent and the Mobile Node;

receiving by the Home Agent a first registration request from the Mobile Node, wherein the first registration request received from the Mobile Node requests the shared session key to be shared between the Home Agent and the Mobile Node, sending by the Home Agent a first registration reply to the Mobile Node, the first registration reply including the shared session key;

receiving by the Home Agent a second registration request from the Mobile Node, the second registration request identifying a care-of address of the Mobile Node and a home address of the Mobile Node, wherein at least a portion of the second registration request has been encrypted using the shared session key;

authenticating by the Home Agent the second registration request using the shared session key;

if the second registration request is successfully authenticated, registering the Mobile Node with the Home Agent in order to establish a Mobile IP session such that a binding between the care-of address of the Mobile Node and the home address of the Mobile Node is created, thereby enabling the Home Agent to forward packets addressed to the home address to the Mobile Node at the care-of address; and sending by the Home Agent a second registration reply to the Mobile Node, the second registration reply indicating whether registration of the Mobile Node with the Home Agent is successful.

2. The method as recited in claim 1, further comprising:
repeating the obtaining the shared session key step for a plurality of Mobile Nodes prior to receiving a registration request from one of the plurality of Mobile Nodes.

3. The method as recited in claim 1, wherein the first registration request comprises a first extension indicating a request for the dynamically generated shared key.

4. The method as recited in claim 3, wherein the first registration request further comprises a second extension including a first SPI associated with a statically configured key shared between the Mobile Node and the Home Agent.

5. The method as recited in claim 4, wherein the second extension is a MHAE.

6. The method as recited in claim 1, wherein the first registration reply comprises a first extension including the shared session key.

7. The method as recited in claim 6, wherein the shared session key of the first extension is encrypted with the Mobile Node's master key maintained by the key distribution center, thereby enabling the Mobile Node to decrypt the encrypted shared session key using the Mobile Node's master key.

8. The method as recited in claim 6, wherein the first registration reply further comprises a second extension including a second SPI associated with the dynamically generated session key to be shared between the Mobile Node and the Home Agent.

9. The method as recited in claim 8, wherein the second extension is a MHAE.

10. The method as recited in claim 8, wherein the second registration request includes a care-of address of the Mobile Node and a MHAE including the second SPI encrypted with the dynamically generated shared session key, the method further comprising:
updating a mobility binding table to include a binding between the Mobile Node and the care-of address of the Mobile Node when registration with the Home Agent is successful.

11. The method as recited in claim 1, wherein obtaining a shared session key is performed prior to receiving the first registration request.

12. The method as recited in claim 1, wherein obtaining a shared session key is performed after receiving the first registration request.

13. The method as recited in claim 1, wherein establishing communication with the key distribution center comprises:
sending a REQUEST packet to the key distribution center requesting a KDC session key to be shared between the key distribution center and the Home Agent; and
receiving a REPLY packet from the key distribution center including the KDC session key.

14. The method as recited in claim 13, wherein the key distribution center maintains a master key for the Home Agent, the Mobile Node, and the key distribution center, and wherein the REQUEST packet is an AS_REQUEST packet implemented in the Kerberos protocol and the REPLY packet is an AS_REPLY packet implemented in the Kerberos protocol, and wherein the AS_REPLY includes a first portion including the KDC session key encrypted with the Home Agent's master key and a second portion including a ticket granting ticket encrypted with the key distribution center's master key.

15. The method as recited in claim 14, wherein obtaining the shared session key comprises:
sending a TGS_REQUEST packet to the key distribution center including the first dynamically generated key shared between the Home Agent and the key distribution center and including the encrypted ticket granting ticket, the TGS_REQUEST packet identifying the Mobile Node; and
receiving a TGS_REPLY packet from the key distribution center including the shared session key in a first portion of the TGS_REPLY and a second portion of the TGS_REPLY, the first portion of the TGS_REPLY including the shared session key encrypted with the first dynamically generated key and the second portion of the TGS_REPLY including the shared session key encrypted with the Mobile Node's master key.

16. The method as recited in claim 1, wherein obtaining the shared session key comprises:
sending a REQUEST packet to the key distribution center including the first dynamically generated key shared between the Home Agent and the key distribution center, the REQUEST packet identifying the Mobile Node and indicating a request to communicate with the Mobile Node; and
receiving a REPLY packet from the key distribution center including the shared session key.

17. The method as recited in claim 16, wherein the REQUEST packet is a TGS_REQUEST packet implemented in the Kerberos protocol and the REPLY packet is a TGS_REPLY packet implemented in the Kerberos protocol.

18. The method as recited in claim 1, wherein the Mobile IP session cannot be transferred to another Mobile Node.

19. In a Mobile Node, a method of registering with a Home Agent, comprising:
sending by the Mobile Node a first registration request to the Home Agent indicating a request for a dynamically generated session key between the Mobile Node and the Home Agent;
receiving by the Mobile Node a first registration reply from the Home Agent including the dynamically generated session key between the Mobile Node and the Home Agent, wherein the dynamically generated session key has been obtained by the Home Agent from a key distribution center, thereby enabling the Mobile Node to register with the Home Agent by sending a subsequent registration request using the dynamically generated session key;
composing by the Mobile Node a second registration request using the shared session key such that at least a portion of the second registration request is encrypted using the shared session key, the second registration request identifying a care-of address of the Mobile Node and a home address of the Mobile Node;
sending by the Mobile Node the second registration request to the Home Agent, thereby enabling the Home Agent to authenticate the registration request using the shared session key; and
receiving by the Mobile Node a second registration reply from the Home Agent, the second registration reply indicating whether the Home Agent has established a Mobile IP session such that a binding between the care-of address of the Mobile Node and the home address of the Mobile Node is created, thereby enabling the Home Agent to forward packets addressed to the home address to the Mobile Node at the care-of address.

20. The method as recited in claim 19, wherein the Mobile IP session cannot be transferred to another Mobile Node.

21. In a Mobile Node, a method of obtaining a shared key shared between the Mobile Node and a Home Agent, comprising:

establishing by the Mobile Node communication with a key distribution center to obtain a first dynamically generated key shared between the Mobile Node and the key distribution center;

obtaining by the Mobile Node a shared session key from the key distribution center using the first dynamically generated key shared between the Mobile Node and the key distribution center, the shared session key being a dynamically generated key to be shared by the Home Agent and the Mobile Node;

providing by the Mobile Node the shared session key to the Home Agent;

composing by the Mobile Node a registration request using the shared session key that has been obtained from the key distribution center such that at least a portion of the registration request is encrypted using the shared session key, the registration request identifying a care-of address of the Mobile Node and a home address of the Mobile Node; and sending by the Mobile Node the registration request to the Home Agent, thereby enabling the Home Agent to authenticate the registration request using the shared session key; and receiving by the Mobile Node a registration reply from the Home Agent, the registration reply indicating whether the Home Agent has established a Mobile IP session such that a binding between the care-of address of the Mobile Node and the home address of the Mobile Node is created, thereby enabling the Home Agent to forward packets addressed to the home address to the Mobile Node at the care-of address.

22. The method as recited in claim 21, wherein providing the shared session key to the Home Agent is performed in an AP_REQUEST Kerberos packet.

23. The method as recited in claim 21, wherein providing the shared session key to the Home Agent is performed in a registration request packet.

24. In a first mobility entity, a method of authenticating a second mobility entity, comprising:

establishing by the first mobility entity communication with a key distribution center to obtain a first dynamically generated key shared between the first mobility entity and the key distribution center;

obtaining by the first mobility entity a shared session key from the key distribution center using the first dynamically generated key shared between the first mobility entity and the key distribution center, the shared session key being a dynamically generated key to be shared by the first mobility entity and the second mobility entity; and providing by the first mobility entity the shared session key to the second mobility entity, wherein the first mobility entity is a Home Agent and the second mobility entity is a Mobile Node;

wherein the shared session key is to be used by the Home Agent to authenticate a registration request packet received from the Mobile Node and the shared session key is to be used by the Mobile Node to authenticate a registration reply packet received from the Home Agent, wherein at least a portion of the registration request packet has been encrypted using the shared session key, wherein the registration request packet identifies a home address of the Mobile Node and a care-of address of the Mobile Node;

wherein when the registration request packet is successfully authenticated, the Mobile Node is registered with the Home Agent in order to establish a Mobile IP session such that a binding between the care-of address of the Mobile Node and the home address of the Mobile Node is created, thereby enabling the Home Agent to forward packets addressed to the home address to the Mobile Node at the care-of address.

25. A computer-readable medium storing thereon computer-readable instructions for authenticating a Mobile Node in a Home Agent, comprising:

instructions for establishing by the Home Agent communication with a key distribution center to obtain a first dynamically generated key shared between the Home Agent and the key distribution center;

instructions for obtaining by the Home Agent a shared session key from the key distribution center using the first dynamically generated key shared between the Home Agent and the key distribution center, the shared session key being a dynamically generated key to be shared by the Home Agent and the Mobile Node;

instructions for processing by the Home Agent a first registration request received from the Mobile Node, wherein the first registration request received from the Mobile Node requests the shared session key to be shared between the Home Agent and the Mobile Node, instructions for composing and sending by the Home Agent a first registration reply to the Mobile Node, the first registration reply including the shared session key;

instructions for processing by the Home Agent a second registration request received from the Mobile Node, the second registration request identifying a care-of address of the Mobile Node and a home address of the Mobile Node, wherein at least a portion of the second registration request has been encrypted using the shared session key;

instructions for authenticating by the Home Agent the second registration request using the shared session key;

instructions for registering the Mobile Node with the Home Agent in order to establish a Mobile IP session such that a binding between the care-of address of the Mobile Node and the home address of the Mobile Node is created, thereby enabling the Home Agent to forward packets addressed to the home address to the Mobile Node at the care-of address; and instructions for composing and sending by the Home Agent a second registration reply to the Mobile Node, the second registration reply indicating whether registration of the Mobile Node with the Home Agent is successful.

26. A Home Agent adapted for authenticating a Mobile Node, comprising:

means for establishing by the Home Agent communication with a key distribution center to obtain a first dynamically generated key shared between the Home Agent and the key distribution center;

means for obtaining by the Home Agent a shared session key from the key distribution center using the first dynamically generated key shared between the Home Agent and the key distribution center, the shared session key being a dynamically generated key to be shared by the Home Agent and the Mobile Node;

means for receiving by the Home Agent a first registration request from the Mobile Node, wherein the first registration request received from the Mobile Node requests the shared session key to be shared between the Home Agent and the Mobile Node, means for sending by the Home Agent a first registration reply to the Mobile Node, the first registration reply including the shared session key;

means for receiving by the Home Agent a second registration request from the Mobile Node, the second registration request identifying a care-of address of the Mobile Node and a home address of the Mobile Node, wherein at least a portion of the second registration request has been encrypted using the shared session key;

means for authenticating by the Home Agent the second registration request using the shared session key;

means for registering the Mobile Node with the Home Agent in order to establish a Mobile IP session such that a binding between the care-of address of the Mobile Node and the home address of the Mobile Node is created, thereby enabling the Home Agent to forward packets addressed to the home address to the Mobile Node at the care-of address; and means for sending by the Home Agent a second registration reply to the Mobile Node, the second registration reply indicating whether registration of the Mobile Node with the Home Agent is successful.

27. A Home Agent adapted for authenticating a Mobile Node, comprising:

a processor; and a memory, at least one of the processor or the memory being adapted for:

establishing by the Home Agent communication with a key distribution center to obtain a first dynamically generated key shared between the Home Agent and the key distribution center;

obtaining by the Home Agent a shared session key from the key distribution center using the first dynamically generated key shared between the Home Agent and the key distribution center, the shared session key being a dynamically generated key to be shared by the Home Agent and the Mobile Node;

receiving by the Home Agent a first registration request from the Mobile Node, wherein the first registration request received from the Mobile Node requests the shared session key to be shared between the Home Agent and the Mobile Node, sending by the Home Agent a first registration reply to the Mobile Node, the first registration reply including the shared session key;

receiving by the Home Agent a second registration request from the Mobile Node, the second registration request identifying a care-of address of the Mobile Node and a home address of the Mobile Node, wherein at least a portion of the second registration request has been encrypted using the shared session key;

authenticating by the Home Agent the second registration request using the shared session key;

if the second registration request is successfully authenticated, registering by the Home Agent the Mobile Node with the Home Agent in order to establish a Mobile IP session such that a binding between the care-of address of the Mobile Node and the home address of the Mobile Node is created, thereby enabling the Home Agent to forward packets addressed to the home address to the Mobile Node at the care-of address; and sending by the Home Agent a second registration reply to the Mobile Node, the second registration reply indicating whether registration of the Mobile Node with the Home Agent is successful.

28. The Home Agent as recited in claim 27, at least one of the processor or the memory being further adapted for:

storing the shared session key in a security association table.

29. The Home Agent as recited in claim 27, wherein the key distribution center is implemented in a network authentication protocol.

30. The Home Agent as recited in claim 29, wherein the network authentication protocol is Kerberos.

31. The Home Agent as recited in claim 27, wherein the Mobile IP session cannot be transferred to another Mobile Node.

32. A computer-readable medium storing thereon computer-readable instructions for registering a Mobile Node with a Home Agent, comprising:

instructions for sending by the Mobile Node a first registration request to the Home Agent indicating a request for a dynamically generated session key between the Mobile Node and the Home Agent;

instructions for processing by the Mobile Node a first registration reply received from the Home Agent, the first registration reply including the dynamically generated session key between the Mobile Node and the Home Agent, wherein the dynamically generated session key has been obtained by the Home Agent from a key distribution center, thereby enabling the Mobile Node to register with the Home Agent by sending a subsequent registration request using the dynamically generated session key;

instructions for composing by the Mobile Node a second registration request using the dynamically generated session key such that at least a portion of the second registration request is encrypted using the dynamically generated session key and sending the second registration request to the Home Agent, thereby enabling the Home Agent to authenticate the second registration request using the dynamically generated session key, wherein the second registration request identifies a care-of address of the Mobile Node and a home address of the Mobile Node; and instructions for processing by the Mobile Node a second registration reply received from the Home Agent, the second registration reply indicating whether the Home Agent has established a Mobile IP session such that a binding between the care-of address of the Mobile Node and the home address of the Mobile Node is created, thereby enabling the Home Agent to forward packets addressed to the home address to the Mobile Node at the care-of address.

33. A Mobile Node adapted for registering with a Home Agent, comprising:

means for sending by the Mobile Node a first registration request to the Home Agent indicating a request for a dynamically generated session key between the Mobile Node and the Home Agent;

means for receiving by the Mobile Node a first registration reply from the Home Agent including the dynamically generated session key between the Mobile Node and the Home Agent, wherein the dynamically generated session key has been obtained by the Home Agent from a key distribution center, thereby enabling the Mobile Node to register with the Home Agent by sending a subsequent registration request using the dynamically generated session key;

means for composing by the Mobile Node a second registration request using the dynamically generated session key such that at least a portion of the second registration request is encrypted using the dynamically generated session key and sending the second registration request to the Home Agent, thereby enabling the Home Agent to authenticate the second registration request using the dynamically generated session key, wherein the second registration request identifies a care-of address of the Mobile Node and a home address of the Mobile Node; and means for processing by the Mobile Node a second registration reply received from the Home Agent, the second registration reply indicating whether the Home Agent has established a Mobile IP session such that a binding between the care-of address of the Mobile Node and the home address of the Mobile Node is created, thereby enabling the Home Agent to forward packets addressed to the home address to the Mobile Node at the care-of address.

34. A Mobile Node adapted for registering with a Home Agent, comprising:

a processor; and a memory, at least one of the processor or the memory being adapted for:

sending by the Mobile Node a first registration request to the Home Agent indicating a request for a dynamically generated session key between the Mobile Node and the Home Agent;

receiving by the Mobile Node a first registration reply from the Home Agent including the dynamically generated session key between the Mobile Node and the Home Agent, wherein the dynamically generated session key has been obtained by the Home Agent from a key distribution center, thereby enabling the Mobile Node to register with the Home Agent by sending a subsequent registration request using the dynamically generated session key;

composing by the Mobile Node a second registration request using the dynamically generated session key such that at least a portion of the second registration request is encrypted using the dynamically generated session key, wherein the second registration request identifies a care-of address of the Mobile Node and a home address of the Mobile Node;

sending by the Mobile Node the second registration request to the Home Agent, thereby enabling the Home Agent to authenticate the second registration request using the dynamically generated session key; and processing by the Mobile Node a second registration reply received from the Home Agent, the second registration reply indicating whether the Home Agent has established a Mobile IP session such that a binding between the care-of address of the Mobile Node and the home address of the Mobile Node is created, thereby enabling the Home Agent to forward packets addressed to the home address to the Mobile Node at the care-of address.

35. A computer-readable medium storing thereon computer-readable instructions for obtaining a shared key shared between a Mobile Node and a Home Agent in the Mobile Node, comprising:

instructions for establishing by the Mobile Node communication with a key distribution center to obtain a first dynamically generated key shared between the Mobile Node and the key distribution center;

instructions for obtaining by the Mobile Node a shared session key from the key distribution center using the first dynamically generated key shared between the Mobile Node and the key distribution center, the shared session key being a dynamically generated key to be shared by the Home Agent and the Mobile Node;

instructions for providing by the Mobile Node the shared session key to the Home Agent;

instructions for composing by the Mobile Node a registration request using the shared session key that has been obtained from the key distribution center such that at least a portion of the registration request is encrypted using the shared session key and sending the registration request to the Home Agent, thereby enabling the Home Agent to authenticate the registration request using the shared session key, the registration request identifying a care-of address of the Mobile Node and a home address of the Mobile Node; and instructions for processing by the Mobile Node a registration reply received from the Home Agent, the registration reply indicating whether the Home Agent has established a Mobile IP session such that a binding between the care-of address of the Mobile Node and the home address of the Mobile Node is created, thereby enabling the Home Agent to forward packets addressed to the home address to the Mobile Node at the care-of address.

36. A Mobile Node adapted for obtaining a shared key shared between the Mobile Node and a Home Agent, comprising:

means for establishing by the Mobile Node communication with a key distribution center to obtain a first dynamically generated key shared between the Mobile Node and the key distribution center;

means for obtaining by the Mobile Node a shared session key from the key distribution center using the first dynamically generated key shared between the Mobile Node and the key distribution center, the shared session key being a dynamically generated key to be shared by the Home Agent and the Mobile Node;

means for providing by the Mobile Node the shared session key to the Home Agent;

means for composing by the Mobile Node a registration request using the shared session key that has been obtained from the key distribution center such that at least a portion of the registration request is encrypted using the shared session key, the registration request identifying a care-of address of the Mobile Node and a home address of the Mobile Node;

means for sending by the Mobile Node the registration request to the Home Agent, thereby enabling the Home Agent to authenticate the registration request using the shared session key; and means for processing by the Mobile Node a registration reply received from the Home Agent, the registration reply indicating whether the Home Agent has established a Mobile IP session such that a binding between the care-of address of the Mobile Node and the home address of the Mobile Node is created, thereby enabling the Home Agent to forward packets addressed to the home address to the Mobile Node at the care-of address.

37. A Mobile Node adapted for obtaining a shared key shared between the Mobile Node and a Home Agent, comprising:

a processor; and a memory, at least one of the processor or the memory being adapted for:

establishing by the Mobile Node communication with a key distribution center to obtain a first dynamically generated key shared between the Mobile Node and the key distribution center;

obtaining by the Mobile Node a shared session key from the key distribution center using the first dynamically generated key shared between the Mobile Node and the key distribution center, the shared session key being a dynamically generated key to be shared by the Home Agent and the Mobile Node;

providing by the Mobile Node the shared session key to the Home Agent;

composing a registration request using the shared session key that has been obtained from the key distribution center such that at least a portion of the registration request is encrypted using the shared session key, the registration request identifying a care-of address of the Mobile Node and a home address of the Mobile Node;

sending by the Mobile Node the registration request to the Home Agent, thereby enabling the Home Agent to authenticate the registration request using the shared session key; and processing by the Mobile Node a registration reply received from the Home Agent, the registration reply indicating whether the Home Agent has established a Mobile IP session such that a binding between the care-of address of the Mobile Node and the home address of the Mobile Node is created, thereby enabling the Home Agent to forward packets addressed to the home address to the Mobile Node at the care-of address.

38. A computer-readable medium storing thereon computer-readable instructions for authenticating a second mobility entity in a first mobility entity, comprising:

instructions for establishing by the first mobility entity communication with a key distribution center to obtain a first dynamically generated key shared between the first mobility entity and the key distribution center;

instructions for obtaining by the first mobility entity a shared session key from the key distribution center using the first dynamically generated key shared between the first mobility entity and the key distribution center, the shared session key being a dynamically generated key to be shared by the first mobility entity and the second mobility entity; and instructions for providing by the first mobility entity the shared session key to the second mobility entity, wherein the first mobility entity is a Home Agent and the second mobility entity is a Mobile Node;

wherein the shared session key is to be used by the Home Agent to authenticate a registration request packet received from the Mobile Node and the shared session key is to be used by the Mobile Node to authenticate a registration reply packet received from the Home Agent, wherein at least a portion of the registration request packet has been encrypted using the shared session key, wherein the registration request packet identifies a home address of the Mobile Node and a care-of address of the Mobile Node;

wherein when the registration request packet is successfully authenticated, the Mobile Node is registered with the Home Agent in order to establish a Mobile IP session such that a binding between the care-of address of the Mobile Node and the home address of the Mobile Node is created, thereby enabling the Home Agent to forward packets addressed to the home address to the Mobile Node at the care-of address.

39. A first mobility entity adapted for authenticating a second mobility entity, comprising:

means for establishing by the first mobility entity communication with a key distribution center to obtain a first dynamically generated key shared between the first mobility entity and the key distribution center;

means for obtaining by the first mobility entity a shared session key from the key distribution center using the first dynamically generated key shared between the first mobility entity and the key distribution center, the shared session key being a dynamically generated key to be shared by the first mobility entity and the second mobility entity; and means for providing by the first mobility entity the shared session key to the second mobility entity, wherein the first mobility entity is a Home Agent and the second mobility entity is a Mobile Node;

wherein the shared session key is to be used by the Home Agent to authenticate a registration request packet received from the Mobile Node and the shared session key is to be used by the Mobile Node to authenticate a registration reply packet received from the Home Agent, wherein at least a portion of the registration request packet has been encrypted using the shared session key, wherein the registration request packet identifies a home address of the Mobile Node and a care-of address of the Mobile Node;

wherein when the registration request packet is successfully authenticated, the Mobile Node is registered with the Home Agent in order to establish a Mobile IP session such that a binding between the care-of address of the Mobile Node and the home address of the Mobile Node is created, thereby enabling the Home Agent to forward packets addressed to the home address to the Mobile Node at the care-of address.

40. A first mobility entity adapted for authenticating a second mobility entity, comprising:

a processor; and a memory, at least one of the processor or the memory being adapted for:

establishing by the first mobility entity communication with a key distribution center to obtain a first dynamically generated key shared between the first mobility entity and the key distribution center;

obtaining by the first mobility entity a shared session key from the key distribution center using the first dynamically generated key shared between the first mobility entity and the key distribution center, the shared session key being a dynamically generated key to be shared by the first mobility entity and the second mobility entity; and providing by the first mobility entity the shared session key to the second mobility entity, wherein the first mobility entity is a Home Agent and the second mobility entity is a Mobile Node;

wherein the shared session key is to be used by the Home Agent to authenticate a registration request packet received from the Mobile Node and the shared session key is to be used by the Mobile Node to authenticate a registration reply packet received from the Home Agent, wherein at least a portion of the registration request packet has been encrypted using the shared session key, wherein the registration request packet identifies a home address of the Mobile Node and a care-of address of the Mobile Node;

wherein when the registration request packet is successfully authenticated, the Mobile Node is registered with the Home Agent in order to establish a Mobile IP session such that a binding between the care-of address of the Mobile Node and the home address of the Mobile Node is created, thereby enabling the Home Agent to forward packets addressed to the home address to the Mobile Node at the care-of address.

* * * * *